Figure 1:
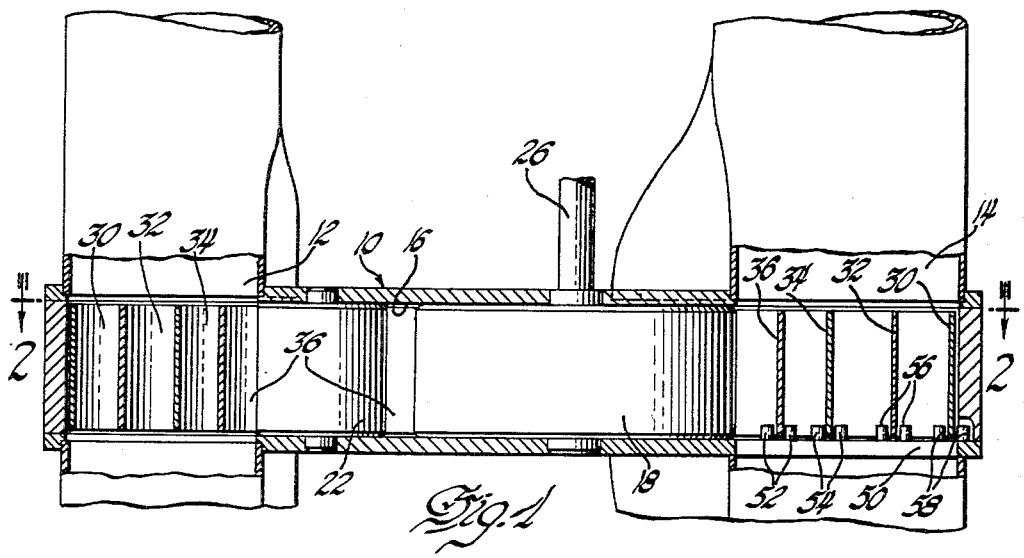

May 31, 1960    J. S. COLLMAN    2,938,713

REGENERATIVE HEAT EXCHANGER

Filed Nov. 18, 1955

INVENTOR.
John S. Collman
BY E. W. Chrieten
ATTORNEY 2,938,713

REGENERATIVE HEAT EXCHANGER

John S. Collman, Detroit, Mich., assignor to General Motors Corporation, Detroit, Mich., a corporation of Delaware Filed Nov. 18, 1955, Ser. No. 547,662

5 Claims. (Cl. 257—266)

This invention relates to heat exchangers and more particularly to regenerative heat exchangers of the type utilizing movable matrixes.

Seals are provided in regenerators with movable matrixes to minimize leakage between the pressure fluid passages. The matrixes are usually rigid assemblies of spaced laminae to provide maximum surface exposure in the flow passages for efficient heat transfer. The spaced laminae are objectionable from a leakage standpoint as they carry trapped fluid across the seals.

An object of the invention is to provide a generator wherein fluid carry-over between the pressure fluid passages is reduced to a minimum without reducing the heat transfer effectiveness of the matrix.

The invention provides a regenerator with a laminated flexible matrix, the laminate of which are separated while passing through the pressure fluid passages to maintain maximum exposure of the heat transfer surfaces and joined while passing through the seal to reduce fluid carry-over losses.

Further objects and advantages of the present invention will be apparent from the following description, reference being had to the accompanying drawing, wherein a preferred form of the present invention is clearly shown.

Figure 2:
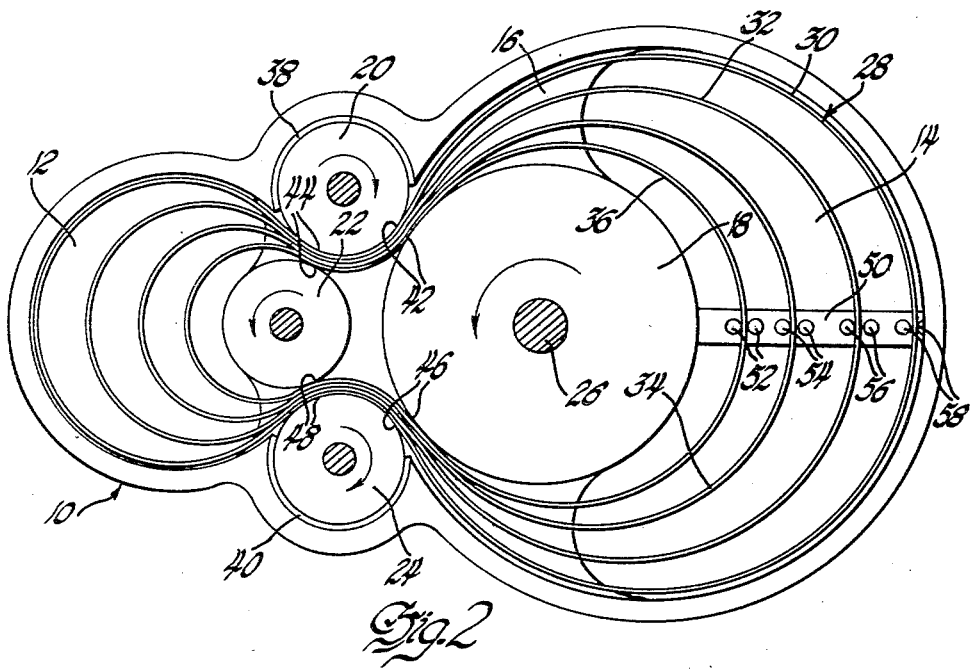

In the drawing:

Figure 1 is a plan view, partially broken away, of a regenerator in accordance with the invention; and Figure 2 is a section taken substantially on the plane indicated by the line 2—2 of Figure 1.

Referring to the drawing, a casing 10 forms a pair of separate pressure fluid flow passages 12 and 14 for different temperature fluids and a chamber 16 connecting the passages. A plurality of spaced pulleys 18, 20, 22 and 24 are rotationally supported in the chamber 16 and at least one of the pulleys is provided with a drive shaft 26. A rotational matrix 28 is located in the flow passages 12 and 14 and chamber 16 to transfer heat from one passage to the other.

The matrix 28 comprises a plurality of endless belts or laminae 30, 32, 34 and 36 of different lengths arranged in laminar or encircling relation. The invention may be practiced with various types of belting, e.g., solid, perforated, mesh, smooth or corrugated belts may be used. The particular belts shown are welded from highly flexible, solid spring steel strips, are normally circular in configuration, and mount on the pulleys in sprung, figure 8 configuration. The spacing between the pulleys is substantially equal to the total thickness of the belts so the pulleys can provide driving support and maintain the belts in local face-to-face contact in the chamber 16.

A pair of semi-cylindrical bearings 38 and 40 engage the rollers 20 and 24 to reduce fluid leakage between the rollers and casing 16. Fluid leakage between the inner rollers 18 and 22 and the outer rollers 20 and 24 is negligible for the belt laminae occupy the gaps 42, 44, 46 and 48 between the rollers. The arrangement thus provides a positive rolling seal between the flow passages 12 and 14 and reduces fluid leakage to an absolute minimum. The belts separate in the fluid passages 12 and 14 because of their diverse length to present maximum heat transfer surface exposure. A cross strut 50 in the casing passage 14 has a plurality of roller pairs 52, 54, 56 and 58 that lightly engage opposite sides of the belts to insure against shifting.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A regenerative heat exchanger comprising a casing having a pair of flow passages for separate pressure fluids and a cross passage connecting the flow passages, a matrix including a plurality of endless belts extending in the cross and flow passages, the cross passage having means therein cooperating with the outer surface of the matrix to seal against fluid leakage about the matrix from one flow passage to the other, means for moving the belts in the passages to provide heat transfer between the fluids, means for separating the belts from each other in the flow passages, and means for interengaging the belts with each other in the cross passage to seal against fluid leakage between the belts from one flow passage to the other whereby the matrix presents a maximum exposure area in the flow passages and a minimum sealing area in the cross passage.

2. A regenerative heat exchanger comprising a casing having a pair of flow passages for separate pressure fluids and a cross passage connecting the flow passages, a matrix including a plurality of endless flexible belts of diverse lengths extending in the cross and flow passages, the cross passage having means therein cooperating with the outer surface of the matrix to seal against fluid leakage about the matrix from one flow passage to the other, said means including pulley means interengaging the belts with each other in the cross passage to seal against fluid leakage between the belts from one flow passage to the other and to present a minimum sealing area in the cross passage, means to move the belts in the passages to provide heat transfer between the fluids, and means to separate the belts in the flow passages to present a maximum exposure area therein.

3. A regenerative heat exchanger comprising a casing having a pair of flow passages for separate pressure fluids and a chamber connecting the passages, a rotational matrix in the flow passages and chamber comprising a plurality of endless belts arranged in laminar relation, the chamber having means therein cooperating with the outer surface of the matrix to seal against fluid leakage about the matrix from one flow passage to the other, means for placing chamber occupying portions of the belts in face-to-face contact with each other to seal against fluid leakage between the belts from one flow passage to the other and so that the matrix presents a minimum sealing area in the chamber, and means for separating flow passage occupying portions of the belts from each other whereby the matrix presents a maximum exposure area in the flow passages.

4. A regenerative heat exchanger comprising a casing having a pair of flow passages for separate pressure fluids and a chamber connecting the passages, a rotational matrix in the flow passages and chamber comprising a plurality of endless flexible belts arranged in laminar relation, the chamber having means therein cooperating with the outer surface of the matrix to seal against fluid leakage about the matrix from one flow passage to the other, said means including a plurality of pulleys in the chamber locally engaging the belts to place chamber occupying portions of the belts in face-to-face contact with each other to seal against fluid leakage between the belts from one flow passage to the other and so that the matrix presents a minimum sealing area in the chamber, and means for separating flow passage occupying portions of the belts from each other whereby the matrix presents a maximum exposure area in the flow passages.

5. A regenerative heat exchanger comprising a casing having a pair of flow passages for separate pressure fluids and a chamber connecting the passages, a rotational matrix in the flow passages and chamber comprising a plurality of endless springable belts of diverse lengths arranged in lamina relation, the chamber having means therein cooperating with the outer surface of the matrix to seal against fluid leakage about the matrix from one flow passage to the other, said means including pulley means in the chamber locally engaging the belts to place chamber occupying portions of the belts in face-to-face contact with each other to seal against fluid leakage between the belts from one flow passage to the other and so that the matrix presents a minimum sealing area in the chamber, the flow passage occupying portions of the belts separating from each other because of the springability and the diversity in length whereby the matrix presents a maximum exposure area in the flow passages, and means for maintaining said separation during operation.

References Cited in the file of this patent

UNITED STATES PATENTS

| | | |
|---|---|---|
| 1,443,134 | Klug | Jan. 23, 1923 |
| 2,119,978 | Wolthuis et al. | June 7, 1938 |
| 2,740,615 | Scholl | Apr. 3, 1956 |
| 2,866,624 | Holmquist | Dec. 30, 1958 |

FOREIGN PATENTS

| | | |
|---|---|---|
| 448,381 | Italy | Mar. 3, 1948 |
| 521,855 | Italy | Mar. 30, 1955 |
| 855,651 | Germany | Nov. 13, 1952 |
| 251,895 | Great Britain | May 13, 1926 |